US011669740B2

(12) United States Patent
Zhao et al.

(10) Patent No.: US 11,669,740 B2
(45) Date of Patent: Jun. 6, 2023

(54) GRAPH-BASED LABELING RULE AUGMENTATION FOR WEAKLY SUPERVISED TRAINING OF MACHINE-LEARNING-BASED NAMED ENTITY RECOGNITION

(71) Applicant: Robert Bosch GmbH, Stuttgart (DE)

(72) Inventors: Xinyan Zhao, Ann Arbor, MI (US); Haibo Ding, Santa Clara, CA (US); Zhe Feng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 282 days.

(21) Appl. No.: 17/185,664

(22) Filed: Feb. 25, 2021

(65) Prior Publication Data

US 2022/0269939 A1  Aug. 25, 2022

(51) Int. Cl.
*G06N 3/08* (2023.01)
*G06F 40/30* (2020.01)
*G06F 40/295* (2020.01)
*G06N 3/042* (2023.01)

(52) U.S. Cl.
CPC ............ *G06N 3/08* (2013.01); *G06F 40/295* (2020.01); *G06F 40/30* (2020.01); *G06N 3/042* (2023.01)

(58) Field of Classification Search
CPC .......... G06N 3/08; G06N 3/042; G06N 3/044; G06N 20/00; G06F 40/295; G06F 40/30
See application file for complete search history.

(56) References Cited

U.S. PATENT DOCUMENTS

2021/0216813 A1 * 7/2021 Pouyan ............... G06F 18/2323

OTHER PUBLICATIONS

Bach et al., "Learning the Structure of Generative Models without Labeled Data", Proceedings of the 34th International Conference on Machine Learning, Sep. 2017, 16 pages.
Beltagy et al., "SciBert: A Pretrained Language Model for Scientific Text", Sep. 2019, 6 pages.
Cao et al., "Low-Resource Name Tagging Learned with Weakly Labeled Date", Aug. 2019, 10 pages.
Changpinyo et al., "Multi-Task Learning for Sequence Tagging: An Emperical Study", Aug. 2018, 17 pages.
(Continued)

*Primary Examiner* — Daniel C Washburn
*Assistant Examiner* — Athar N Pasha
(74) *Attorney, Agent, or Firm* — Michael Best & Friedrich, LLP

(57) ABSTRACT

Systems and methods for training a machine-learning model for named-entity recognition. A rule graph is constructed including a plurality of nodes each corresponding to a different labeling rule of a set of labeling rules (including a set of seeding rules of known labeling accuracy and a plurality of candidate rules of unknown labeling accuracy). The nodes are coupled to other nodes based on which rules exhibit the highest sematic similarity. A labeling accuracy metric is estimated for each candidate rule by propagating a labeling confidence metric through the rule graph from the seeding rules to each candidate rule. A subset of labeling rules is then identified by ranking the rules by their labeling confidence metric. The identified subset of labeling rules is applied to unlabeled data to generate a set of weakly labeled named entities and the machine-learning model is trained based on the set of weakly labeled named entities.

18 Claims, 6 Drawing Sheets

(56) References Cited

OTHER PUBLICATIONS

Cohen et al., "Exploiting Dictionaries in Named Entity Extraction: Combining Semi-Markov Extraction Processes and Data Integration Methods", Center for Automated Learning and Discovery, 2004, 10 pages.

Devlin et al., "BERT: Pre-training of Deep Bidirectional Transformers for Language Understanding", Proceedings of the 2019 Conference of the North American Chapter of the Association for Computational Linguistics, May 2019, 16 pages.

Dogan et al., "NCBI Disease Corpus: A Resource for Disease Name Recognition and Concept Normalization", J Biomed Inform, vol. 47, Feb. 2014, 28 pages.

Eftimov et al., "A rule-based named-entity recognition method for knowledge extraction of evidence based dietary recommendations", PLOS One, Jun. 2017, 32 pages.

Fries et al., "SwellShark: A Generative Model for Biomedical Named Entity Recognition without Labeled Data", Apr. 2017, 11 pages.

Giannakopoulos et al., "Unsupervised Aspect Term Extraction with B-LSTM & CRF using Automatically Labelled Datasets", Proceedings of the 8th Workshop on Computational Approaches to Subjectivity, Sentiment and Social Media Analysis, Sep. 2017, pp. 180-188.

Greenberg et al., "Marginal Likelihood Training of BiLSTM-CRF for Biomedical Named Entity Recognition from Disjoint Label Sets", Proceedings of the 2018 Conference on Empirical Methods in Natural Language Processing, Nov. 2018, pp. 2824-2829.

Huang et al., "Bidirectional LSTM-CRF Models for Sequence Tagging", Aug. 2015, 10 pages.

Jiao et al., "Semi-Supervised Conditional Random Fields for Improved Sequence Segmentation and Labeling", Proceedings of the 21st International Conference on Computational Linguistics and 44th Annual Meeting of the ACL, Jul. 2006, pp. 209-219.

Lee et al., "Transfer Learning for Named-Entity Recognition with Neural Networks", Proceedings of the Eleventh International Conference on Language Resources and Evaluation, 2018, pp. 4470-4473.

Li et al., "BioCreative V CDR task corpus: a resource for chemical disease relation extraction", Database, 2016, vol. 2016, 10 pages.

Lin et al., "TriggerNER: Learning with Entity Triggers as Explanations for Named Entity Recognition", Jul. 2020, 10 pages.

Lison et al., "Named Entity Recognition without Labelled Data: A Weak Supervision Approach", Apr. 2020, 16 pages.

Liu et al., "Empower Sequence Labeling with Task-Aware Neural Language Model", Nov. 2017, 8 pages.

Liu et al., "Towards Improving Neural Named Entity Recognition with Gazetteers", Proceedings of the 57th Annual Meeting of the Assoication for Computational Linguistics, Jul. 2019, pp. 5301-5307.

Mann et al., "Generalized Expectation Criteria for Semi-Supervised Learning with Weakly Labeled Data", Journal of Machine Learning Research, vol. 11, 2010, pp. 955-985.

Neelakantan et al., "Learning Dictionaries for Named Entity Recognition using Minimal Supervision", Proceedings of the 14th Conference of the European Chapter of the Association for Computational Linguistics, Apr. 2014, pp. 452-461.

Peters et al., "Deep contextualized word representations", Mar. 2018, 15 pages.

Pontiki et al., "SemEval-2016 Task 5: Aspect Based Sentiment Analysis", Proceedings of SemEval-2016, Jun. 2016, pp. 19-30.

Ratner et al., "Snorkel: Rapid Training Data Creation with Weak Supervision", Proceedings of the VLDB Endowment, vol. 11, No. 3, Nov. 2017, 17 pages.

Ren et al., "CoType: Joint Extraction of Typed Entities and Relations with Knowledge Bases", Jun. 2017, 10 pages.

Safranchik et al., "Weakly Supervised Sequence Tagging from Noisy Rules", Association for the Advancement of Artifical Intelligence, 2020, 11 pages.

Savova et al., "Mayo clinical Text Analysis and Knowledge Extraction Systems (cTAKES): architecture, component evaluation and applications", J Am Med Inform Assoc., vol. 17, 2010, pp. 507-513.

Shang et al., "Learning Named Entity Tagger using Domain-Specific Dictionary", Proceedings of the 2018 Conference on Empirical Methods in Natural Language Processing, Sep. 2018, 11 pages.

Xu et al, "MedEx: a medication information extraction system for clinical narratives", J Am Med Inform Assoc, vol. 17, 2017, pp. 19-24.

Yang et al., "Distantly Supervised NER with Partial Annotation Learning and Reinforcement Learning", Proceedings of the 27th International Conference on Computational Linguistics, Aug. 2018, pp. 2159-2169.

Yang et al., "Transfer Learning for Sequence Tagging With Hierarchical Recurrent Networks", ICLR, 2017, 10 pages.

Zhou et al., "Named Entity Recognition using an HMM-based Chunk Tagger", Proceedings of the 40th Annual Meeting of the Association for Computational Lingusitics, Jul. 2002, pp. 473-480.

\* cited by examiner

|  | Rule1 | Rule2 | Rule3 | Rule4 | Rule5 |
|---|---|---|---|---|---|
| CandidateEntity1 | Disease | Disease | Disease | Disease | Disease |
| CandidateEntity2 | Disease | Other | Other | Other | Disease |
| CandidateEntity3 | Other | Other | Other | Other | Other |
| CandidateEntity4 | Other | Disease | Other | Other | Other |
• • •
FIG. 8
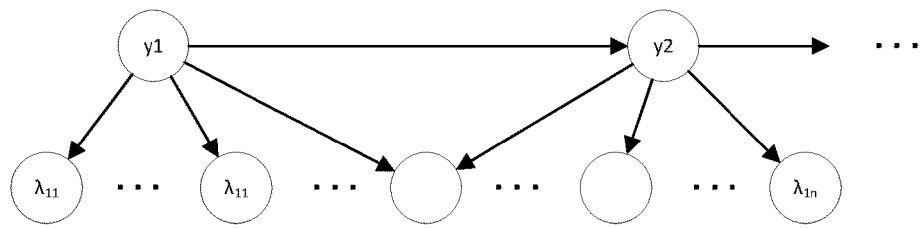
FIG. 9
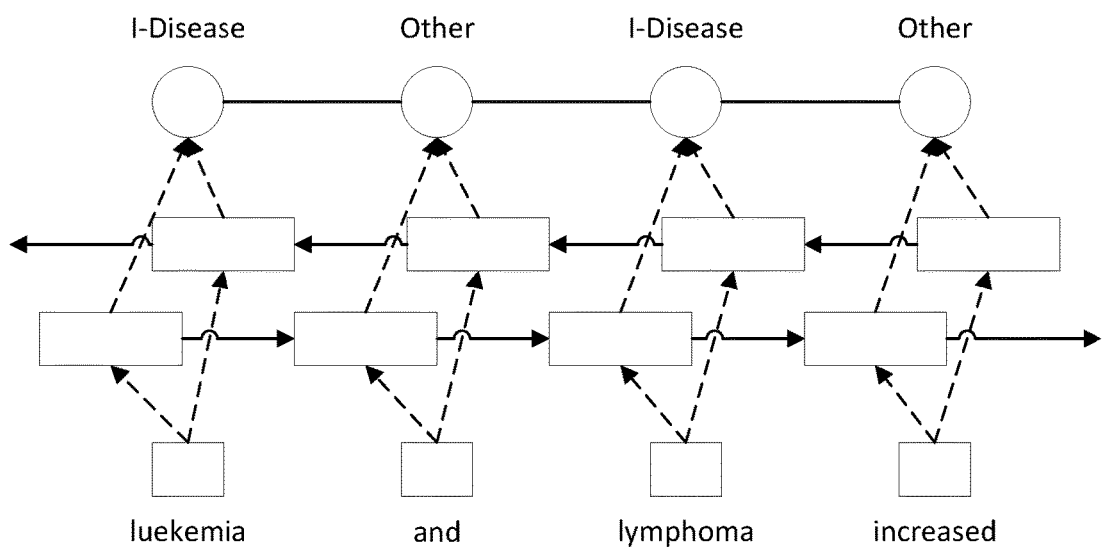
FIG. 10

GRAPH-BASED LABELING RULE AUGMENTATION FOR WEAKLY SUPERVISED TRAINING OF MACHINE-LEARNING-BASED NAMED ENTITY RECOGNITION

BACKGROUND

The present invention relates to machine-learning models and systems & methods for training machine-learning models. In particular, the implementations of the present invention relate to systems and methods for training a machine-learning model to perform named-entity recognition (NER).

SUMMARY

Named-entity recognition (NER) models are machine-learning mechanisms trained to automatically detect "named entities" (e.g., people, locations, items, conditions, etc.) in unlabeled text (e.g., an input sentence, paragraph, articles, etc.) and to determine an appropriate category label for each detected named entity. One method for training an NER model is to provide manually-labeled data as training data for the NER model. However, due to the high cost of such manual annotations, collecting labeled data to train MER models may be challenging and expensive in real-world situations. Another approach for training NER models is to apply a set of heuristic rules (e.g., "labelling rules") to the unlabeled data in order to generate a set of "weakly" labeled data that is then be used as training data for the NER model. However, this approach may also require domain experts to manually write labelling rules for a NER task, which are then applied to a text to generate labeled data that is used train the NER model. One advantage of approaches using "labelling rules" is that manual annotations/labeling is not required. However, developing appropriate labeling rules can also be challenging—particularly for certain domain-specific tasks. Devising accurate rules often demands a significant amount of manual effort because it requires developers that have deep domain expertise and a thorough understanding of the target data.

The systems and methods described in the examples of this disclosure provide a framework to automatically learn new labelling rules from unlabeled data. The framework is designed around a concept of sematic similarity in which two rule candidates that can accurately label the same type of entities are semantically related via the entities matched by them. Accordingly, new labeling rules are acquired based on their semantic relatedness with a relatively small set of "seeding" rules.

In some implementations, the system is configured to automatically create a graph with nodes representing candidate rules extracted from unlabeled data. A new graph neural network then augments the labelling rules by exploring semantic relations between rules. Finally, the augmented rules are applied to the unlabeled data to generate weak labels that are then used to train a NER model.

In some implementations, the system is configured to process the unlabeled text to extract all possible rules (i.e., "candidate rules") that match one of a defined number of possible rule types. For each rule type, a graph of rules is built by connecting rules based on their semantic similarities. In some such implementations, the semantic similarity between rules is quantified by calculating an "embedding" vector of the rule as the average on the contextual embedding vectors of all entity mentions matched by the rule. Semantic similarities between rules can then be quantified by the cosine similarity between the embedding vectors of two rules. A graph neural network model is then used to identify a set of labelling rules. A label matrix is then constructed by applying each rule in the set of labelling rules to each token in the unlabeled data. A generative model is then used to estimate the "correct" labels for each token based on the data from the label matrix. Finally, a discriminative NER model is trained using the correct labels for each token In one embodiment, the invention provides a method of training a machine-learning model for named-entity recognition. A rule graph is constructed by an electronic processor. The rule graph includes a plurality of nodes each corresponding to a different labeling rule of a set of labeling rules. The set of labeling rules includes a plurality of candidate rules of unknown labeling accuracy and a set of seeding rules with a known labeling accuracy. The nodes of the rule graph are coupled to other nodes based on which rules exhibit the highest sematic similarity. A labeling accuracy metric is estimated for each candidate rule by propagating a labeling confidence metric through the rule graph from the seeding rules to each candidate rule. A subset of labeling rules is then identified by ranking the rules by their labeling confidence metric. The identified subset of labeling rules is applied to unlabeled data to generate a set of weakly labeled named entities and the machine-learning model is trained based on the set of weakly labeled named entities.

In another embodiment, the invention provides a system for training a machine-learning model to perform named-entity recognition. The system includes an electronic processor configured to construct a rule graph. The rule graph includes a plurality of nodes each corresponding to a different labeling rule of a set of labeling rules. The set of labeling rules includes a plurality of candidate rules of unknown labeling accuracy and a set of seeding rules with a known labeling accuracy. The nodes of the rule graph are coupled to other nodes based on which rules exhibit the highest sematic similarity. The electronic processor is also configured to estimate a labeling accuracy metric for each candidate rule by propagating a labeling confidence metric through the rule graph from the seeding rules to each candidate rule. The electronic processor then identifies a subset of labeling rules by ranking the rules by their labeling confidence metric. The identified subset of labeling rules is applied to unlabeled data to generate a set of weakly labeled named entities and the machine-learning model is trained based on the set of weakly labeled named entities.

Other aspects of the invention will become apparent by consideration of the detailed description and accompanying drawings.

BRIEF DESCRIPTION OF THE DRAWINGS

FIG. 8 is a table with an example of a labelling matrix constructed by applying the identified labeling rules to the unlabeled text in the method of FIG. 4.

FIG. 9 is a schematic diagram of an example of a generative model applied to the labelling matrix of FIG. 8 in the method of FIG. 4.

FIG. 10 is a schematic diagram of an example of a discriminative machine-learning model trained by the method of FIG. 4.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
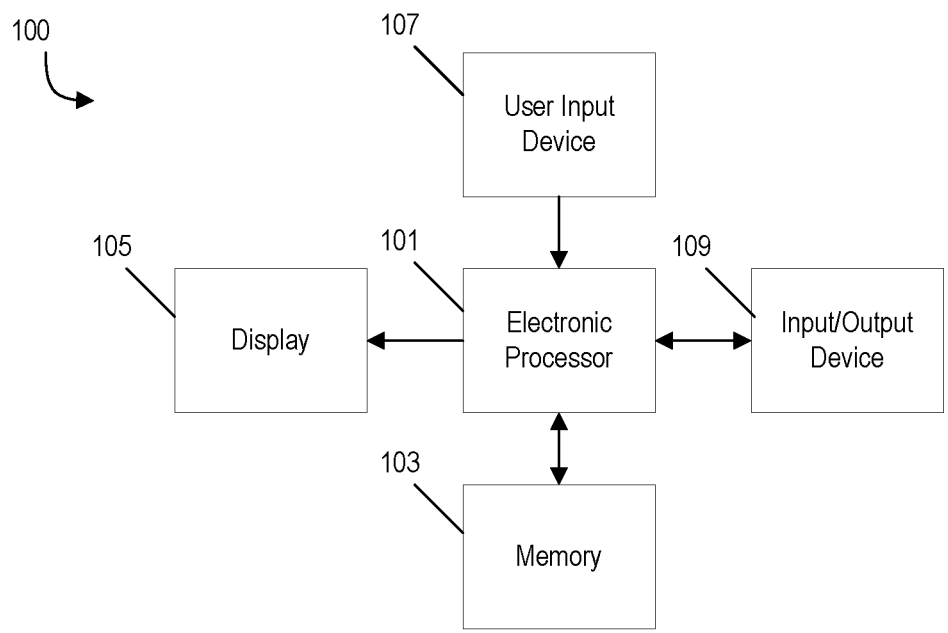
FIG. 1 is a block diagram of a system for training and/or applying a named-entity recognition (NER) model for detecting and categorizing named-entities appearing in unlabeled text.

FIG. 1 illustrates an example of a computer-based system 100 that may be configured for training a named-entity recognition (NER) machine-learning mechanism, for applying a trained NER mechanism, or both. The system 100 includes an electronic processor 101 and a non-transitory computer-readable memory 103. The memory 103 stores data and computer-executable instructions that are accessed and executed by the electronic processor 101 to provide the functionality of the system 100 including, for example, the functionality described herein below. The electronic processor 101 is communicative coupled to a display 105 and a user input device 107 (e.g., a keyboard, mouse, touch screen, etc.) to provide a user interface for operating the system 100 and for displaying data to a user. The electronic processor 101 is also communicatively coupled to an input/output device 109 (e.g., a wired or wireless communication interface) for communicating with other computer-based systems.

Figure 2:
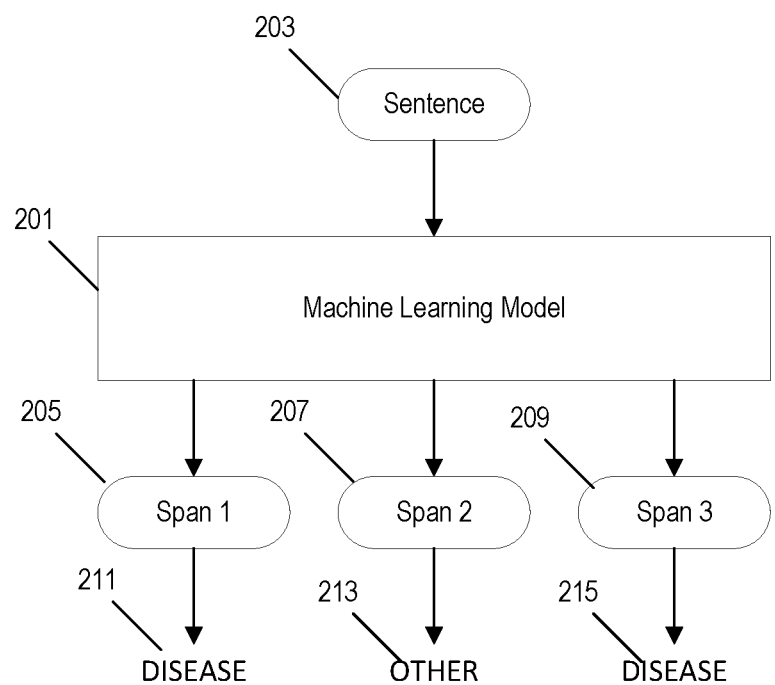
FIG. 2 is a schematic diagram of a NER model trained and/or applied by the system of FIG. 1.

FIG. 2 illustrates an example of a machine learning model trained and/or applied by the system 100 of FIG. 1. The machine learning model 201 is configured to receive as input unstructured and unlabeled text including, for example, a textual sentence 203. In response to receiving the input text, the machine learning model is configured to output each of a plurality of "spans" of text from the sentence and a label assigned for each span. The labels output by the machine learning model 201 indicate whether the span has been identified as a named-entity and, if so, which category label has been assigned to the span. In some implementations, the machine learning model 201 is configured to output a label for every possible span in the unlabeled text (e.g., either a label identifying a specific labelling category or a "NEG" label indicating that the span is not a "named entity"). However, in other implementations, the machine learning model 201 is configured to produce as output only the spans that have been determined to be a "named entity" and the label assigned to each detected "named entity."

In the example of FIG. 2, the machine learning model has produced as output three different spans 205, 207, 209 from the input sentence 203. The first span 205 has been assigned a "DISEASE" label 211 by the machine learning model 201 indicating that the text of the first span 205 has been identified as corresponding to the name of a disease. The second span 207 has been assigned an "OTHER" label 213 by the machine learning model 201 indicating either (A) that the text of the second span 207 has been identified as corresponding to a named-entity, but that the machine learning model 201 is not able to determine an appropriate category label for the named-entity or (B) that the text of the second span 207 is not a named entity. Lastly, the third span 209 has been assigned a "DISEASE" label 215 by the machine learning model 201 indicating that the text of the third span 209 has been identified as corresponding to the name of a disease. Although the example of FIG. 2 illustrates only two category labels (i.e., "DISEASE" and "OTHER"), in various implementations, the machine learning model 201 may be trained and configured to assign other category labels to text spans in addition to or instead of those illustrated in the example of FIG. 2. Other category labels may include, but are not necessarily limited to locations, people, buildings, businesses, countries, equipment/objects, etc.

Figure 3:
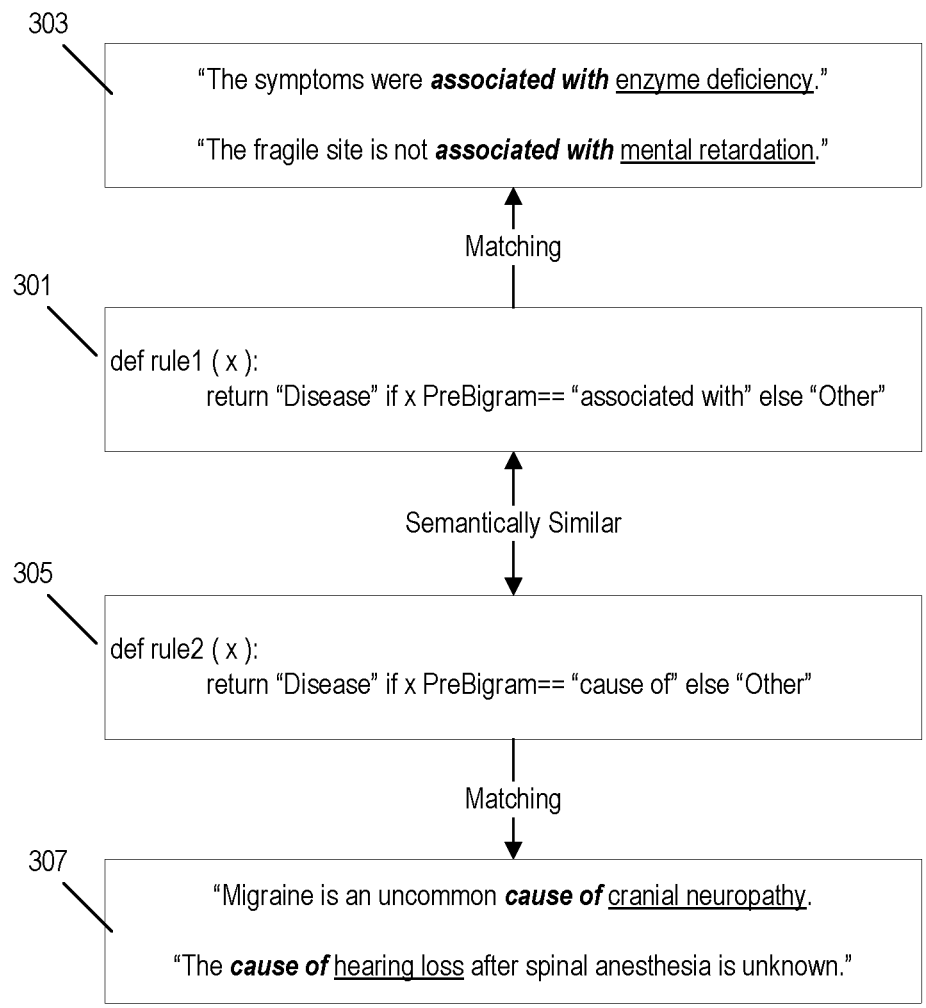
FIG. 3 is a block diagram of an example of semantically similar labelling rules for detecting and labeling named-entities in unlabeled text.

The systems and methods described in the examples below are configured to automatically generate a set of candidate rules from the unlabeled text and to determine which labelling rules to apply to generate a set of training data for the machine learning mechanism based on the concept of semantic similarity. FIG. 3 illustrates an example of two labelling rules that are semantically similar. According to rule 1 (box 301), a candidate entity is labelled as a "DISEASE" if the two words immediately preceding the candidate entity in the unlabeled text are the words "associated with." Rule 1 matches with the two text examples illustrated in box 303: "The symptoms were associated with enzyme deficiency" and "The fragile site is not associated with mental retardation." Each of these sentences includes the phrase "associated with" and, therefore, according to Rule 1, the candidate entity that immediately follows the words "associated with" is labeled as a "DISEASE" by Rule 1. Accordingly, Rule 1 identifies the phrases "enzyme deficiency" and "mental retardation" as "DISEASES" in the example of FIG. 3.

Similarly, according to rule 2 (box 305), a candidate entity is labelled as a "DISEASE" if the two words immediately preceding the candidate entity in the unlabeled text are the words "cause of." Rule 2 matches with the two text examples illustrated in box 307: "Migraine is an uncommon cause of cranial neuropathy" and "The cause of hearing loss after spinal anesthesia is unknown." Each of these sentences in box 307 includes the phrase "cause of" and, therefore, according to Rule 1, the candidate entity that immediately follows the words "cause of" is labeled as a "DISEASE" by Rule 2. Accordingly, Rule 2 identifies the phrases "cranial neuropathy" and "hearing loss" as "DISEASES" in the example of FIG. 3.

If we know that the "associated with" rule 301 is an accurate rule for labeling diseases and we determine that the "cause of" rule 305 is semantically related to the "associated with" rule 301, then we can conclude that the "cause of" rule 305 is also an accurate rule for labeling diseases.

Figure 4:
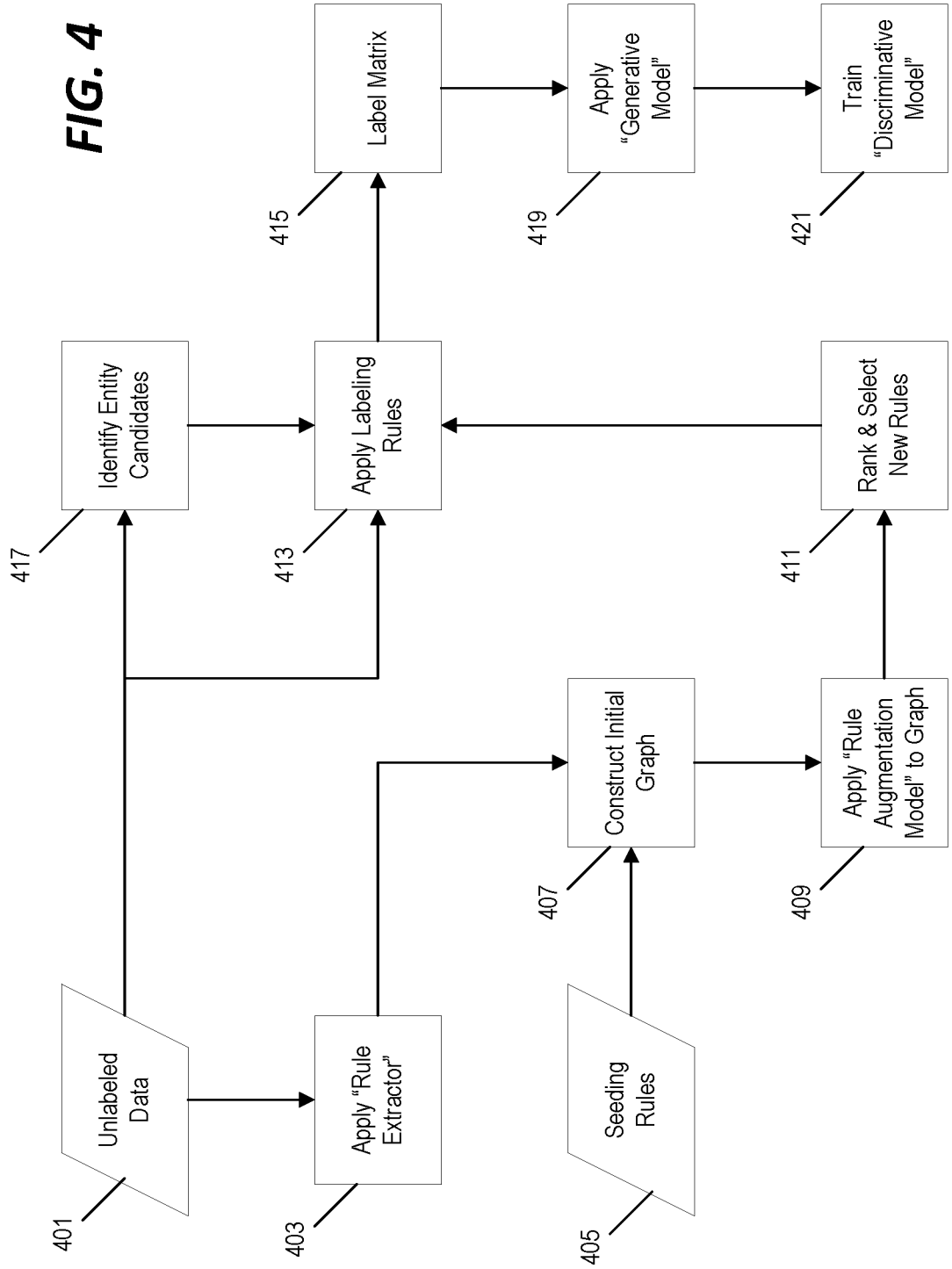
FIG. 4 is a flowchart of a method for training the NER model of FIG. 2 using the system of FIG. 1.

FIG. 4 illustrates a method for training a discriminative NER model. In particular, the framework of FIG. 4 builds a weakly supervised NER training data set with a small set of manually selected seeding rules. The system then learns new rules from unlabeled data using graph neural networks based on the hypothesis that semantically similar rules should have similar abilities to recognize and label named entities. The newly learned rules are then used to train the discriminative NER model to improve the performance of named entity recognition (NER).

In the example of FIG. 4, a set of unlabeled data 401 is provided as input to a "Rule Extractor" (step 403). The "Rule Extractor" is configured to extract all possible rules from the unlabeled text as "candidate rules" using a define set of rule "types" or "templates" (as described in further detail below). For each rule type, an initial graph is constructed (step 407) by connecting rules (both candidate rules from the Rule Extractor and a small set of seeding rules 405) based on their semantic similarities. A Rule Augmentation model is then applied to the initial graph (step 409) to propagate a metric of labeling confidence from the seeding rules to the other candidate rules. The candidate rules are then ranked by the labeling confidence metric and a set of the most highly ranked candidate rules are selected as the labeling rules (step 411). The selected labeling rules are then applied to the unlabeled data (step 413) to generate a label matrix 415. In some implementations, the system is configured to identify entity candidates from the unlabeled text (step 417) by extracting all noun phrases (NPs) from the unlabeled text using a set of "Part-of-Speech" (POS) patterns. In this way, the computational load can be reduced by applied the labeling rules (step 413) only to the identified entity candidates instead of applying the rules to every text span in the unlabeled data.

The "correct" label for each candidate entity is then estimated based on the data in the label matrix by using a generative model (step 419). Finally, a discriminative NER model is trained using the "correct" labels (step 421). More specifically, the discriminative NER model is trained to produce as output the list of candidate entities and the assigned labels as determined by the generative model in response to receiving the unlabeled data 401 as input.

As discussed above, the system may be configured to identify candidate entities by extracting all noun phrases (NPs) from an unlabeled sentence using a set of "Part-of-Speech" (POS) patterns. The POS patterns may include, for example, "JJ? NN+", where JJ denotes an adjective and NN denotes a noun). In some implementations, the system is configured to perform this NP extraction before applying the rule extractor (step 403). In some such implementations, the Rule Extractor is applied by extracting candidate rules from the unlabeled text by applying each of a defined number of "rule types" or "rule templates" to each candidate entity. In one particular example, the system is configured to use the following five rule types to extract candidate rules from unlabeled text for every candidate entity: SurfaceForm rules, Prefix rules, Suffix rules, PreNgram rules, and PostNgram rules.

"SurfaceForm" Rules apply a label to a candidate entity when the text of the candidate entity provides an exact match. For example, the rule [return "Disease" if x SurfaceForm=="enzyme deficiency"] would label candidate entities as a "Disease" only if the text of the candidate entity is "enzyme deficiency".

"Prefix" Rules apply a label to a candidate entity when the first n characters of the candidate entity provides an exact match with a predefined text string. For example, the rule [return "Disease" if x Prefix=="enzy"] would label candidate entities as a "Disease" only if the first 4 characters of the candidate entity are the letters "enzy." Similarly, "Suffix" Rules apply a label to a candidate entity when the last n characters of the candidate entity provides an exact match with a predefined text string. For example, the rule [return "Disease" if x Suffix=="ency"] would label candidate entities as a "Disease" only if the last 4 characters of the candidate entity are the letters "ency".

"PreNgram" Rules apply a label to a candidate entity when the N words immediately preceding the candidate entity provide an exact match with a predefined text string. For example, the rules 301 and 305 in FIG. 3 are examples of "PreNgram" rules. Similarly, "PostNgram" Rules apply a label to a candidate entity when the N words immediately following the candidate entity provide an exact match with a predefined text string.

For example, consider the candidate entity "hearing loss" in the following sentence: "The cause of hearing loss after spinal anesthesia is unknown." In some implementations, the system might be configured to extract the following six rules:

return "Disease" if x SurfaceForm=="hearing loss";
return "Disease" if x Prefix=="hear";
return "Disease" if x Suffix=="loss";
return "Disease" if x PreBigram=="cause of"; and
return "Disease" if x PostBigram=="after spinal"

In this example, the prefix and suffix rules are based on strings of four characters (n=4) and the PreNgram and PostNgram rules are based on strings of two words (N=2). However, the length of these character/word strings can be modified in different implementations and, in some implementations, multiple rules can be extract for each of a plurality of different character and word string lengths.

Also, in addition to the five rule types described above, in some implementations, the system is also configured to extract a sixth rule type for multi-token candidate entities (i.e., candidate entities with multiple words) by extracting the dependency relations of the first token and the second token and then combining them with the last token as "Dependency" rules.

Figure 5:
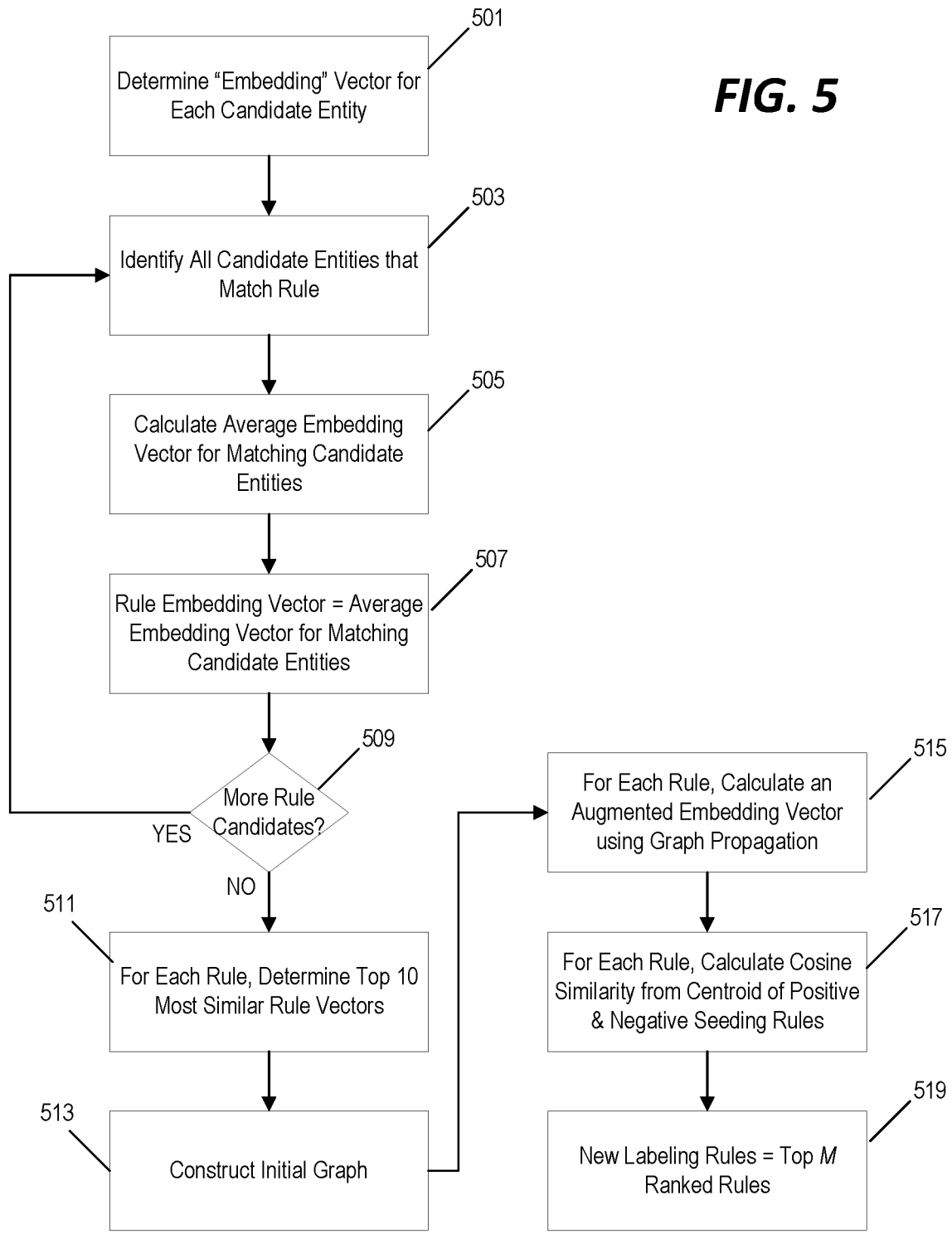
FIG. 5 is a flowchart of a method for quantifying semantic similarity between rules and training the NER model of FIG. 2 based on the quantified semantic similarity.

As described above in reference to FIG. 4, after all of the rule candidates are extracted from the unlabeled data, a rule augmentation model is applied to generate an initial graph based on quantified semantic similarity between rules, augment the graph by propagating labelling confidence from the seeding rules to the candidate rules, and finally selecting a set of labeling rules. FIG. 5 illustrates an example of this process in further detail in which rule embeddings are used to estimate sematic relatedness between rules. First, an "embedding" vector is determined for each candidate entity in the unlabeled data (step 501). An embedding is a representation of a word or phrase in the context of a sentence as a vector. The embedding vector for each candidate entity is calculated using a pre-trained contextual embedding model such as, for example, ELMo.

After the embedding vector of each candidate entity is calculated, an embedding of each rule is calculated by identifying all candidate entities that match the rule (step 503), calculating an average vector of the embedding vectors for each matching candidate entity (step 505), and then setting that calculated average vector as the "rule embedding vector" for the rule (step 507) This process is repeated for every candidate rule and for each seeding rule (step 509). In some implementations, the seeding rules are a relatively small manually selected set of rules and include both positive seeding rules and negative seeding rules for each label category. Positive seeding rules are those that can be used to predict a target entity type. Negative seeding rules are those that can be used to predict instances of the "other" class. For example, for a set of seeding rules for the "DISEASE" label category, positive rules are labeling rules that identify a candidate entity as a "disease" while negative rules are those that identify the candidate entity as not a "disease."

For each rule type, after a Rule Embedding Vector is calculated for every candidate rule and every seeding rule, an initial graph of rules is created. The initial graph may be defined as:

$$G=(V_u, V_s^{pos}, V_s^{neg}, A) \quad (1)$$

where $V_u$ are the candidate rules extracted from the unlabeled text, $V_s^{pos}$ are the positive seeding rules, $V_s^{neg}$ are the negative seeding rules, and A is the adjacency matrix of nodes. In this graph, each node (i.e., rule) is connected with the top X semantically similar nodes where semantic similarity between rules is computed as the cosine similarity between the rule embedding vectors for each rule. In the example of FIG. 5, the system is configured to identify the top 10 most similar rule vectors for each rule (step 511) and to construct the initial graph by connecting each node (i.e., rule) to the nodes corresponding to the top 10 most similar rules (step 513).

After an initial graph is constructed using both the candidate rules and the seeding rules, the problem of learning new labeling rules (i.e., positive rules) is formulated as a graph-based semi-supervised node classification task that aims to classify rule candidates as either positive or negative. As discussed above, based on the premise that semantically similar rules should predict entity labels similarly, the method in the example of FIGS. 4 and 5 uses a Graph Attention Network model to propagate labeling information from seeding nodes to other nodes in the graph. Specifically, given the input rule embedding $h_i$ of node/rule i and its set of neighbors $N_i$, the system computes an attention weight for each connected pair of nodes (i, j) as:

$$a_{i,j} = \frac{\exp(f(A^T[Wh_i, Wh_j]))}{\Sigma_{k \in N_i} \exp(f(A^T[Wh_i, Wh_j]))} \quad (2)$$

where W is a parameter and $f$ is the LeakyReLU activation function. The rule embedding vector of rule i can then be recalculated as:

$$h^*_i = a_{i,j} W h_i + \Sigma_{j \in N_i} W h_i \quad (3)$$

To keep the model stable, a multi-head attention mechanism is applied to obtain K attentional states for each node. The final nod representation is then calculated as the average of the attentional states by the equation:

$$h_i^{*T} = \frac{1}{K} \Sigma_K h_i^{kT} \quad (4)$$

The objective of this model can be defined as follows:

$$L_{total} = L_{sup} + L_{reg} + L_{dist} \quad (5)$$

where $$L_{sup} = -(y_i \log(p_i)) + (1-y_i)\log(1-p_i) \quad (6)$$

$$L_{reg} = \Sigma_{i,j \in N_i} |h_i - h_j|_2 \quad (7)$$

$$L_{dist} = \text{dist}(h_{pos}, h_{neg}) \quad (8)$$

where $L_{sup}$ is the supervised loss computed on both positive and negative seeding rule nodes, $L_{reg}$ is the regularization that encourages connected nodes to share similar representations, and $L_{dist}$ aims to maximize the distance between positive and negative seeding nodes. The function dist(*) computes the cosine similarity between the centroids of the positive and negative seeds. $P_i$ is the probability of a node being classified as positive, and $h_{pos}$ and $h_{neg}$ are the average embeddings of positive and negative nodes, respectively.

Returning now to the example of FIG. 5, when the graph propagation learning process is finished, each rule is associated with a new embedding vector representation $h^{*T}_i$ (step 515). For each rule, the system then calculates a cosine similarity between the rule & the centroid of the positive seeding rules and between the rule & the centroid of the negative seeding rules (step 517). The centroid of the positive seeding rules is the average of the embedding vectors for all of the positive seeding rules in the graph and, similarly, the centroid of the negative seeding rules is the average of the embedding vectors for all of the negative seeding rules in the graph. All of the rules (including the candidate rules and the seeding rules) are then ranked by the difference between the calculated cosine similarities (i.e., a "ranking" metric=(cosine similarity between the rule embedding vector and the centroid of the positive seeding rules)−(cosine similarity between the rule embedding vector and the centroid of the negative seeding rules)). As a result, the highest ranking rules are those that are most semantically similar to rules that are known to be positive rules while also being the least semantically similar to rules that are known to be negative rules. A defined number (M) of the highest ranking rules for each rule type are selected as the labeling rules that will be used to generate the training data for the NER model (step 519).

Figure 6:
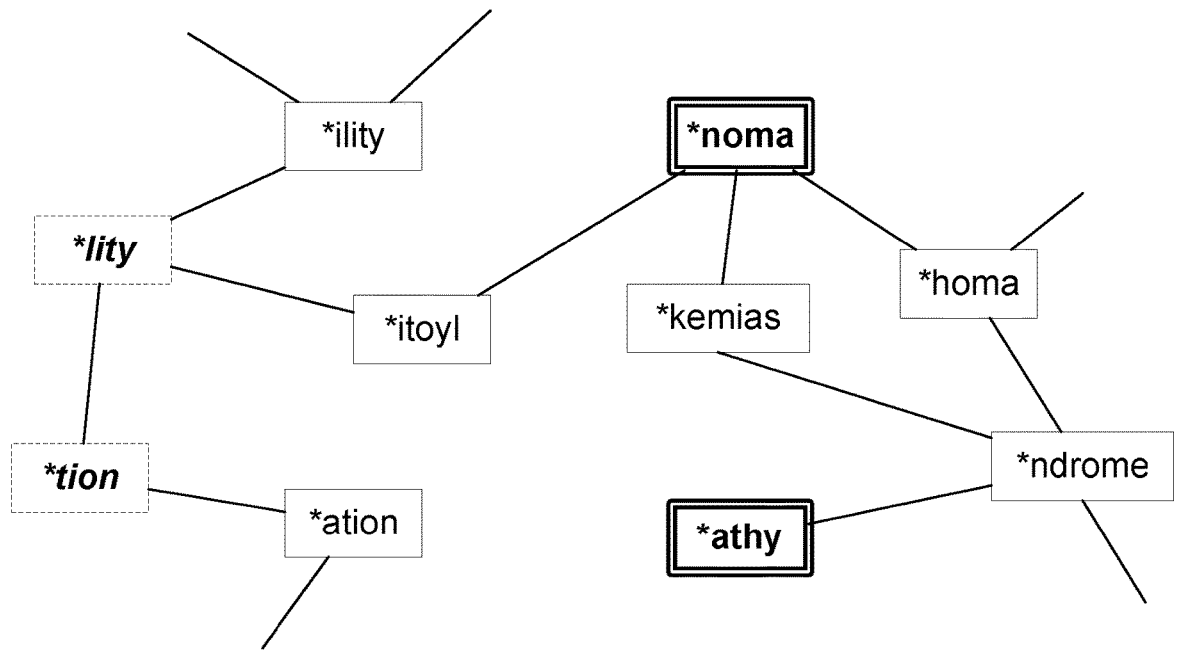
FIG. 6 is a schematic diagram of an example of an initial graph of rule candidates constructed during the method of FIGS. 4 and 5.
Figure 7:
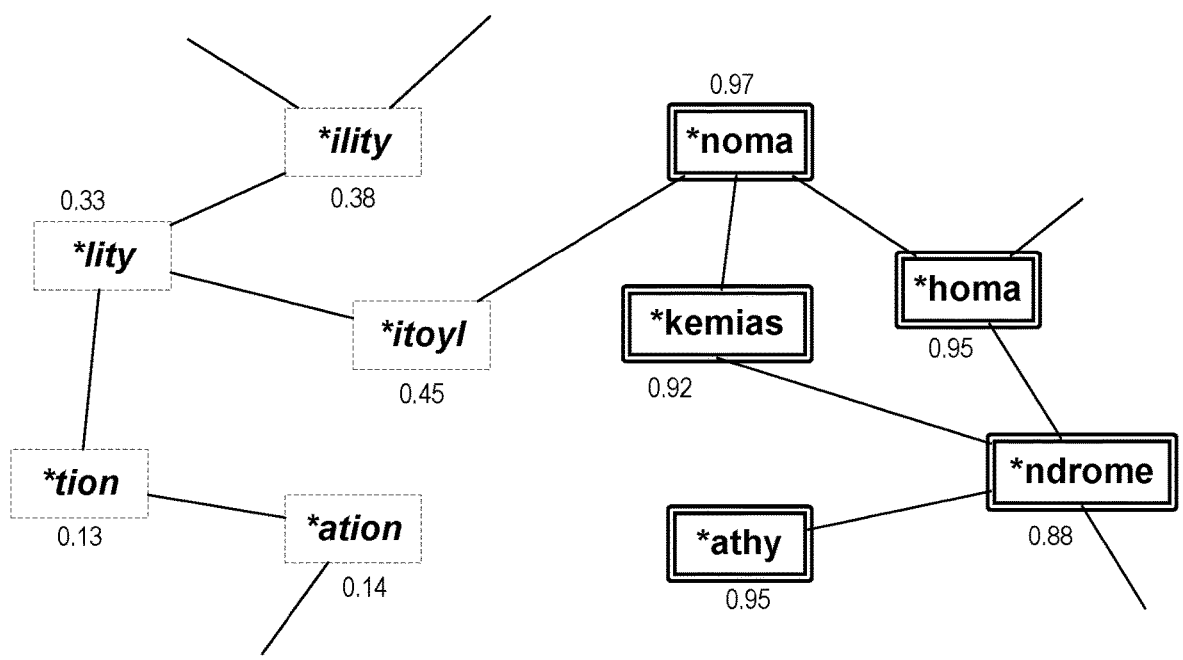
FIG. 7 is a schematic diagram of an example of the graph of FIG. 6 augmented by graph propagation in the method of FIGS. 4 and 5.

FIG. 6 illustrates a graphical example of the "initial graph" generated in step 407 of FIG. 4 and in step 513 of FIG. 5 for a set of "Suffix"-type rules. Positive seeding rules are indicated by bold text and a double-outline border while negative seeding rules are indicated by a dashed border and text that is both italicized and bolded. FIG. 7 illustrates a graphical example of the "augmented graph" generated in step 409 of FIG. 4 and step 517 of FIG. 5. The calculated ranking metric (i.e., a "ranking" metric=(cosine similarity between the rule embedding vector and the centroid of the positive seeding rules)−(cosine similarity between the rule embedding vector and the centroid of the negative seeding rules)) is displayed adjacent to each rule node. High ranking rule nodes will have a ranking metric closer to 1 while lower ranking rule nodes will have a ranking metric closer to 0. Furthermore, candidate rules can be considered as "positive" rules if their ranking metric is greater than a threshold (e.g., 0.5) and can be considered as "negative" rules if their ranking metric is less than the threshold. In the example of FIG. 7, candidate rules are indicated as either positive rules or negative rules using the same notations as the positive and negative seeding rules, respectively, described above in reference to FIG. 6.

As discussed above in reference to FIG. 4, after the rule learning process (e.g., illustrated in FIG. 5) is completed, the identified set of labeling rules are applied to the unlabeled data to produce a label matrix. In some implementations, both the set of labeling rules from the candidate rules and the entire set of original seeding rules are applied to the unlabeled text in order to generate the label matrix. FIG. 8 illustrates an example of a label matrix in which every candidate entity is labeled according to every labeling rule in the identified set of labeling rules. However, as illustrated in the example of FIG. 8, in some situations, different labeling rules can produce different results for the same candidate entity. For example, in FIG. 8, a first candidate entity ("CandidateEntity1") has been consistently labeled as a "Disease" by all of the labeling rules while the second candidate entity ("CandidateEntity2") has only been labeled as a "Disease" by two of the labeling rules and the fourth candidate entity ("CandidateEntity4") has been labeled as a "Disease" by only one of the labeling rules.

Because the resulting labels in the labeling matrix can have conflicts, a generative model is used to combine these labels into one label for each candidate entity (i.e., a "correct" label). For example, in some implementations, the LinkedHMM model is used to treat the true label of a candidate entity as a latent random variable and to estimate its value by relating it to the label outputs from different labeling rules. After the training of the generative model is completed, each candidate entity is associated with a single "weak" label. Each "weak" label is a probability distribution over all entity classes, which can be used to train a discriminative NER model. One advantage of training a discriminative NER model is that it can use other token features while the generative model can only use the outputs of the labeling rules as inputs. Therefore, even if a token is not matched by any labeling rules, the discriminative NER model can still predict it correctly. In some implementations, the BiLSTM-CRF is used as the discriminative model. The model first uses BiLSTM layer to generate a state representation for each token (e.g., candidate entity) in a sequence (i.e., the unlabeled data). The CRF layer then predicts each token by maximizing the expected likelihood of the entire sequence based on the estimated labels.

FIG. 9 illustrates an example diagram of a generative model and FIG. 10 illustrates an example of a discriminative model. Once the discriminative NER model is trained according to the process described above, it is now ready for use in automatically detecting and labeling named entities that appear in other unlabeled text.

The examples above are provided to demonstrate the framework of the process for training a discriminative NER model. Although the examples discuss generating graphs and performing graph propagation for only a single rule type, it is to be understood that the process illustrated in FIG. 5 would be applied to each different rule type to identify new labeling rules of each rule type. In some implementations, the labels applied to the candidate entities by rules of multiple different rule types are included in the same label matrix that is then used to train the generative model and, in turn, the discriminative NER model.

Similarly, although the examples described above focus only on a single label category "diseases," in some implementations, the methods described above are applied for multiple label categories. For example, a separate rule graph may be constructed for each rule type and for each different label category using a different set of positive and negative seeding rules for each different label category. As a result, the graph propagation process will identify the rule candidates that are the most semantically similar to the positive seeding rules for each label category and include those as the labeling rules for that particular category. In turn, all of the labeling rules of multiple different rule types and for multiple different label categories are applied to the unlabeled data in order to construct the label matrix that is used to train the generative model and, in turn, the discriminative NER model.

Accordingly, the invention provides, among other things, systems and methods for training a machine-learning model for named entity recognition by automatically selecting a new set of labelling rules based on a quantification of semantic similarity between a set of automatically generated candidate rules and a set of seeding rules. Other features and advantages are set forth in the following claims.

What is claimed is:

1. A computer-based method of training a machine-learning model for named-entity recognition, the method comprising:
constructing, by an electronic processor, a rule graph including a plurality of nodes, each node of the rule graph corresponding to a different labeling rule of a set of labeling rules,
wherein each node in the rule graph is coupled to a plurality of other nodes based on a metric of semantic similarity between the rules corresponding to the nodes,
wherein each labeling rule of the set of labeling rules is configured to determine whether to apply a particular classification label to a text candidate entity, and
wherein the set of labeling rules includes a plurality of candidate rules of unknown labeling accuracy and a set of seeding rules with a known labeling accuracy;
estimating, by the electronic processor, a labeling accuracy metric for each candidate rule of the plurality of candidate rules by propagating a labeling confidence metric through the rule graph from the seeding rules to each candidate rule;
identifying a subset of labeling rules from the set of labeling rules that have the highest relative labeling confidence metrics after propagating the labeling confidence metric;
applying the subset of labeling rules to unlabeled text data to generate a set of weakly labeled named entities; and
training the machine-learning model based on the set of weakly labeled named entities, wherein the machine-learning model is trained to receive as input the unlabeled text data and to produce as output a classification label assigned to each text candidate entity in the unlabeled text data.

2. The method of claim 1, wherein constructing the rule graph includes:
calculating a rule embedding vector corresponding to each labelling rule of the set of labeling rules;
identifying, for each labeling rule in the set of labeling rules, a defined number of other labeling rules with highest cosine similarity between the rule embedding vectors of the labeling rules; and
coupling the node of each labeling rule to nodes corresponding to the identified defined number of other labeling rules with the highest cosine similarity.

3. The method of claim 2, wherein estimating the labeling accuracy metric for each candidate rule of the plurality of candidate rules includes adjusting the rule embedding vector for each labelling rule of the set of labeling rules based on an attention weight calculated based on each node directly coupled to the node corresponding to the labeling rule.

4. The method of claim 2, wherein the set of seeding rules includes a plurality of positive seeding rules with a known high labeling accuracy for applying a classification label, wherein estimating the labeling accuracy metric for each candidate rule includes
calculating a centroid of the positive seeding rules, wherein the centroid of the positive seeding rules is an average of the rule embedding vectors for each positive seeding rule of the plurality of positive seeding rules, and
calculating the labeling accuracy metric for each candidate rule based on a calculated cosine similarity between the rule embedding vector for the candidate rule and the centroid of the positive seeding rules.

5. The method of claim 2, wherein the set of seeding rules includes a plurality of positive seeding rules with a known high labeling accuracy for applying a classification label and a plurality of negative seeding rules with a known high labeling accuracy for not applying the classification label, wherein estimating the labeling accuracy metric for each candidate rule includes
- calculating a centroid of the positive seeding rules, wherein the centroid of the positive seeding rules is an average of the rule embedding vectors for each positive seeding rule of the plurality of positive seeding rules,
- calculating a centroid of the negative seeding rules, wherein the centroid of the negative seeding rules is an average of the rule embedding vectors for each negative seeding rule of the plurality of negative seeding rules, and
- calculating, for each candidate rule, the labeling accuracy metric as a difference between:
  - a cosine similarity between the rule embedding vector for the candidate rule and the centroid of the positive seeding rules, and
  - a cosine similarity between the rule embedding vector for the candidate rule and the centroid of the negative seeding rules.

6. The method of claim 1, further comprising generating the plurality of candidate rules by
- automatically identifying, by the electronic processor, a plurality of candidate entities in the unlabeled text data input, and
- extracting, for each candidate entity of the plurality of candidate entities, a set of labeling rules defined by each of a defined number of rule templates.

7. The method of claim 6, further comprising constructing a separate rule graph for labeling rules corresponding to each of the rule templates.

8. The method of claim 6, whether the rule templates include a surface form rule template, a prefix rule template, a suffix rule template, a PreNgram rule template, and a PostNgram rule template.

9. The method of claim 1, wherein training the machine-learning model based on the set of weakly labeled named entities includes:
- applying a generative model to the set of weakly labeled named entities to resolve conflicts between category labels assigned to named entities by different labeling rules and to determine a single category label for each named entity; and
- training a discriminative model based on the single category label assigned to each named entity.

10. A computer-based system for training a machine-learning model to perform named-entity recognition of unlabeled text data, the system comprising an electronic processor configured to:
- construct a rule graph including a plurality of nodes, each node of the rule graph corresponding to a different labeling rule of a set of labeling rules,
  - wherein each node in the rule graph is coupled to a plurality of other nodes based on a metric of semantic similarity between the rules corresponding to the nodes,
  - wherein each labeling rule of the set of labeling rules is configured to determine whether to apply a particular classification label to a text candidate entity, and
  - wherein the set of labeling rules includes a plurality of candidate rules of unknown labeling accuracy and a set of seeding rules with a known labeling accuracy;
- estimate a labeling accuracy metric for each candidate rule of the plurality of candidate rules by propagating a labeling confidence metric through the rule graph from the seeding rules to each candidate rule;
- identify a subset of labeling rules from the set of labeling rules that have the highest relative labeling confidence metrics after propagating the labeling confidence metric;
- apply the subset of labeling rules to unlabeled data to generate a set of weakly labeled named entities; and
- train the machine-learning model based on the set of weakly labeled named entities, wherein the machine-learning model is trained to receive as input unlabeled text data and to produce as output a classification label assigned to each text candidate entity in the unlabeled text data.

11. The system of claim 10, wherein the electronic processor is configured to construct the rule graph by:
- calculating a rule embedding vector corresponding to each labelling rule of the set of labeling rules;
- identifying, for each labeling rule in the set of labeling rules, a defined number of other labeling rules with highest cosine similarity between the rule embedding vectors of the labeling rules; and
- coupling the node of each labeling rule to nodes corresponding to the identified defined number of other labeling rules with the highest cosine similarity.

12. The system of claim 11, wherein the electronic processor is configured to estimate the labeling accuracy metric for each candidate rule of the plurality of candidate rules by adjusting the rule embedding vector for each labelling rule of the set of labeling rules based on an attention weight calculated based on each node directly coupled to the node corresponding to the labeling rule.

13. The system of claim 11, wherein the set of seeding rules includes a plurality of positive seeding rules with a known high labeling accuracy for applying a classification label, wherein the electronic processor is configured to estimate the labeling accuracy metric for each candidate rule by
- calculating a centroid of the positive seeding rules, wherein the centroid of the positive seeding rules is an average of the rule embedding vectors for each positive seeding rule of the plurality of positive seeding rules, and
- calculating the labeling accuracy metric for each candidate rule based on a calculated cosine similarity between the rule embedding vector for the candidate rule and the centroid of the positive seeding rules.

14. The system of claim 11, wherein the set of seeding rules includes a plurality of positive seeding rules with a known high labeling accuracy for applying a classification label and a plurality of negative seeding rules with a known high labeling accuracy for not applying the classification label, wherein the electronic processor is configured to estimate the labeling accuracy metric for each candidate rule by
- calculating a centroid of the positive seeding rules, wherein the centroid of the positive seeding rules is an average of the rule embedding vectors for each positive seeding rule of the plurality of positive seeding rules,
- calculating a centroid of the negative seeding rules, wherein the centroid of the negative seeding rules is an average of the rule embedding vectors for each negative seeding rule of the plurality of negative seeding rules, and calculating, for each candidate rule, the labeling accuracy metric as a difference between:
  a cosine similarity between the rule embedding vector for the candidate rule and the centroid of the positive seeding rules, and
  a cosine similarity between the rule embedding vector for the candidate rule and the centroid of the negative seeding rules.

15. The system of claim 10, wherein the electronic processor is further configured to generate the plurality of candidate rules by
  automatically identifying, by the electronic processor, a plurality of candidate entities in the unlabeled text data input, and
  extracting, for each candidate entity of the plurality of candidate entities, a set of labeling rules defined by each of a defined number of rule templates.

16. The system of claim 15, wherein the electronic processor is further configured to construct a separate rule graph for labeling rules corresponding to each of the rule templates.

17. The system of claim 15, whether the rule templates include a surface form rule template, a prefix rule template, a suffix rule template, a PreNgram rule template, and a PostNgram rule template.

18. The system of claim 10, wherein the electronic processor is configured to train the machine-learning model based on the set of weakly labeled named entities by:
  applying a generative model to the set of weakly labeled named entities to resolve conflicts between category labels assigned to named entities by different labeling rules and to determine a single category label for each named entity; and
  training a discriminative model based on the single category label assigned to each named entity.

* * * * *